(12) United States Patent
Vanvolsem et al.

(10) Patent No.: US 8,646,258 B2
(45) Date of Patent: Feb. 11, 2014

(54) MIXING SYSTEM IN AN EXHAUST GAS MIXING CHAMBER

(75) Inventors: Michel Vanvolsem, Montagnieu le Bas (FR); Iyad Balloul, Lyon (FR)

(73) Assignee: Renault Trucks, St. Priest (FR)

(*) Notice: Subject to any disclaimer, the term of this patent is extended or adjusted under 35 U.S.C. 154(b) by 168 days.

(21) Appl. No.: 13/322,542

(22) PCT Filed: Jun. 18, 2009

(86) PCT No.: PCT/IB2009/006345
§ 371 (c)(1),
(2), (4) Date: Nov. 25, 2011

(87) PCT Pub. No.: WO2010/146412
PCT Pub. Date: Dec. 23, 2010

(65) Prior Publication Data
US 2012/0073272 A1    Mar. 29, 2012

(51) Int. Cl.
*F01N 3/00*    (2006.01)
(52) U.S. Cl.
USPC .................. 60/295; 60/286; 60/301; 60/303; 60/324
(58) Field of Classification Search
USPC ............... 60/286, 295, 297, 301, 303, 324
See application file for complete search history.

(56) References Cited

U.S. PATENT DOCUMENTS

| | | | |
|---|---|---|---|
| 6,449,947 B1* | 9/2002 | Liu et al. .................. | 60/286 |
| 6,601,385 B2* | 8/2003 | Verdegan et al. ............ | 60/286 |
| 6,775,973 B2* | 8/2004 | Liu et al. .................. | 60/301 |
| 7,181,906 B2* | 2/2007 | Dalla Betta et al. ........ | 60/286 |
| 7,448,206 B2* | 11/2008 | Meingast et al. ............ | 60/286 |
| 7,814,745 B2* | 10/2010 | Levin et al. ................ | 60/286 |
| 8,297,050 B2* | 10/2012 | Ranganathan et al. ........ | 60/324 |

FOREIGN PATENT DOCUMENTS

| | | |
|---|---|---|
| DE | 102007047774 A1 | 4/2009 |
| EP | 1022048 A1 | 7/2000 |
| FR | 2900439 A3 | 11/2007 |
| FR | 2910532 A1 | 6/2008 |
| JP | 2008115796 | 5/2008 |
| JP | 2008240552 | 10/2008 |
| JP | 2009013809 | 1/2009 |
| JP | 2010-038020 | 2/2010 |

OTHER PUBLICATIONS

International Search Report for corresponding international Application PCT/IB2009/006345.
JP Official Acton (Mar. 5, 2013) from corresponding JP Application 2012-515572.

* cited by examiner

*Primary Examiner* — Binh Q Tran
(74) *Attorney, Agent, or Firm* — WRB-IP LLP

(57) ABSTRACT

The mixing system includes a mixing chamber in which exhaust gases can flow in a flow direction, a nozzle designed to inject a fluid inside the mixing chamber, according to an injection direction, and an evaporating device positioned inside the mixing chamber, downstream from the injection inlet. The nozzle and the evaporating device are movable one with respect to the other, so that a substantial portion of the flow of the fluid injected into the mixing chamber hits the evaporating device regardless of the flow rate of the exhaust gases.

16 Claims, 2 Drawing Sheets

MIXING SYSTEM IN AN EXHAUST GAS MIXING CHAMBER

BACKGROUND AND SUMMARY

The present invention relates to a mixing system especially designed to improve the mixing of a fluid with the exhaust gases of thermal engine, while also preventing the solid deposits of said fluid. The present invention can be used for example in an exhaust mixing chamber of a diesel engine wherein an aqueous solution of urea or fuel is injected in view of an after-treatment of the exhaust gases.

Exhaust gases formed in the combustion of fuel in an internal combustion engine may contain a proportion of undesirable substances such as nitrogen oxides (NOx), carbon monoxide (CO), un-burnt hydrocarbons (HC), soot, etc. . . .

To reduce air pollution, vehicles are therefore equipped with various after-treatment systems that deal with undesirable substances in exhaust gases.

A common exhaust gases after-treatment is a so called selective catalytic reduction (SCR). Exhaust gases wherein ammonia is added as a reducer is treated in a specific catalytic converter where nitrogen oxides are converted into water and nitrogen which are both non toxic substances.

Ammonia is introduced in the form of urea in an aqueous solution from which ammonia is obtained through hydrolysis. Urea is usually nebulised in the exhaust gas upstream of the catalytic converter. To this end, a urea injection nozzle is fitted on the exhaust line upstream from the catalytic converter.

A problem with this type of exhaust gases treatment is that, before it has transformed into ammonia, urea can crystallize. In concrete terms, the aqueous solution of urea which is sprayed through the nozzle inside the exhaust pipe, according to a direction which is angled with respect to the exhaust gases flow direction, tends to form a solid deposit on the exhaust pipe wall, on the internal side thereof, for example opposite of the injection point.

The consequence is that the cross section of the exhaust pipe is progressively reduced, which makes the engine efficiency decrease and which can seriously impair the engine operation in the long term.

Another example of an exhaust after-treatment system comprises a diesel particle filter which removes un-burnt particles contained in the exhaust gases. Such filter may eventually become clogged with the particles and needs to be regenerated from time to time. For promoting regeneration, it is often provided that fuel is injected in the exhaust line and oxidized to increase the exhaust gas temperature up to a point where the particles trapped in filter are oxidized. In this case also, there may appear problems related to the condensation of the fuel.

In both cases, there is, in addition to the problem of clogging or spoiling of the exhaust pipe by the fluid, the problem that the fluid which is not vaporized is then not available for its intended purpose, which can then affect the efficiency of the after-treatment or regeneration process. It is known from document FR-2.900.439 a system where the fluid is injected on an evaporating device located in the exhaust line. Nevertheless, it has proved difficult to design such a system which operates effectively under all engine operating conditions, especially due to the variations in the exhaust gases flow rate. It therefore appears that there is room for improvement in the systems for injecting a fluid in a mixing chamber carrying exhaust gases and mixing them.

It is desirable to provide an improved mixing system which can overcome the drawbacks encountered in conventional mixing systems, and particularly which prevents or at least limits the injected fluid from forming a deposit onto the mixing chamber surface.

An aspect of the invention concerns a mixing system for an exhaust gases after-treatment arrangement, said mixing system comprising:

a mixing chamber (2) in which exhaust gases can flow in a flow direction (FD);

a nozzle (5) designed to inject a fluid inside the mixing chamber (2), from an injection inlet (4) arranged in the mixing chamber wall, according to an injection direction (ID);

an evaporating device (8) positioned inside said mixing chamber (2), downstream from the injection inlet (4);

characterized in that the nozzle (5) and the evaporating device (8) are movable the one with respect to the other, so that a substantial portion of the flow of the fluid injected into said mixing chamber (2) hits the evaporating device (8) regardless of the flow rate of the exhaust gases Thus, in the mixing system according to the invention, the fluid most predominantly hits the evaporating device rather than the mixing chamber wall, whatever the flow rate of the first fluid—in the range of the normal operating conditions. As a result, substantially no or very little solid deposit can form on the mixing chamber wall, and clogging of said mixing chamber is prevented. Moreover, with such a mixing system, the evaporating device causes the fluid to be evaporated, which prevents it from crystallizing on the evaporating device and clogging it. Preferably, the evaporating device is designed to generate turbulence, to enhance the mixing of the injected fluid with the exhaust gases.

Alternatively, the turbulence generating device, or mixing device, can be a separate element which can be positioned either upstream or downstream from the injection inlet. In an implementation of the invention, said evaporating device can comprise a plate substantially orthogonal to the mixing chamber axis and provided with holes for allowing the passage of fluids there through.

Preferably, the evaporating device includes a thermally conductive material. The mixing system according to the invention may further comprise control means capable of controlling the position of the nozzle and/or of the evaporating device relative to the evaporating device or to the nozzle, respectively.

According to other possible features:
  the control means comprise passive means including the thrust of the exhaust gases acting on a movable member for moving the evaporating device and/or the nozzle;
  the control means comprise active means including an actuator acting on a movable member for moving the evaporating device and/or the nozzle;
  the control means comprise biasing means for resisting and counteracting the thrust of the exhaust gases or the actuator;
  the evaporating device is designed to be moved downstream within said mixing chamber when the exhaust gases flow rate increases; — the evaporating device is designed to be moved downstream within said mixing chamber, against the biasing means, under the effect of the exhaust gases thrust, the biasing means aiming at moving said evaporating device upstream with respect to said mixing chamber; with this arrangement, the position of the evaporating device with respect to the nozzle is automatically adjusted as a function of the exhaust gases flow rate;

the evaporating device comprises an inner duct located inside said mixing chamber and having an axis substantially parallel to the mixing chamber axis, and comprises a principal evaporating portion extending substantially across the inner duct; —a substantially cylindrical space is provided between the inner duct and the mixing chamber to allow a small amount of exhaust gases to flow through said space; this ensures that the inner duct can be easily heated by the exhaust gases, when they are hot.

the inner duct is designed to be moved downstream within said mixing chamber under the effect of the exhaust gases thrust, the biasing means aiming at moving said evaporating device upstream with respect to said mixing chamber;

the inner duct has an annular collar projecting inwardly from the upstream edge of said inner duct, the thrust of the exhaust gases applying on said annular collar;

an opening is provided in the inner duct wall to allow the injection of the fluid inside the inner duct through said opening;

the nozzle can pivot with respect to the mixing chamber about an axis which is parallel to a plane substantially tangential to said mixing chamber at the injection inlet and which is orthogonal to the mixing chamber axis so that the flow direction and the injection direction form a varying angle ($\alpha$);

the control means are adapted to pivot the nozzle so that the angle ($\alpha$) between the flow direction and the injection direction increases when the exhaust gases flow rate increases; In such case, the tilted position of the nozzle can then be adjusted so that the injected fluid, drawn by the exhaust gases, is directed towards the evaporating device.

the fluid comprises an aqueous solution of urea, or fuel; and said evaporating device includes a thermally conductive material.

These and other features and advantages will become apparent upon reading the following description in view of the drawings attached hereto representing, as non-limiting examples, embodiments of a mixing system according to the invention.

BRIEF DESCRIPTION OF THE DRAWINGS

The following detailed description of several embodiments of the invention is better understood when read in conjunction with the appended drawings being understood, however, that the invention is not limited to the specific embodiments disclosed. In the drawings.

DETAILED DESCRIPTION

Figure 1:
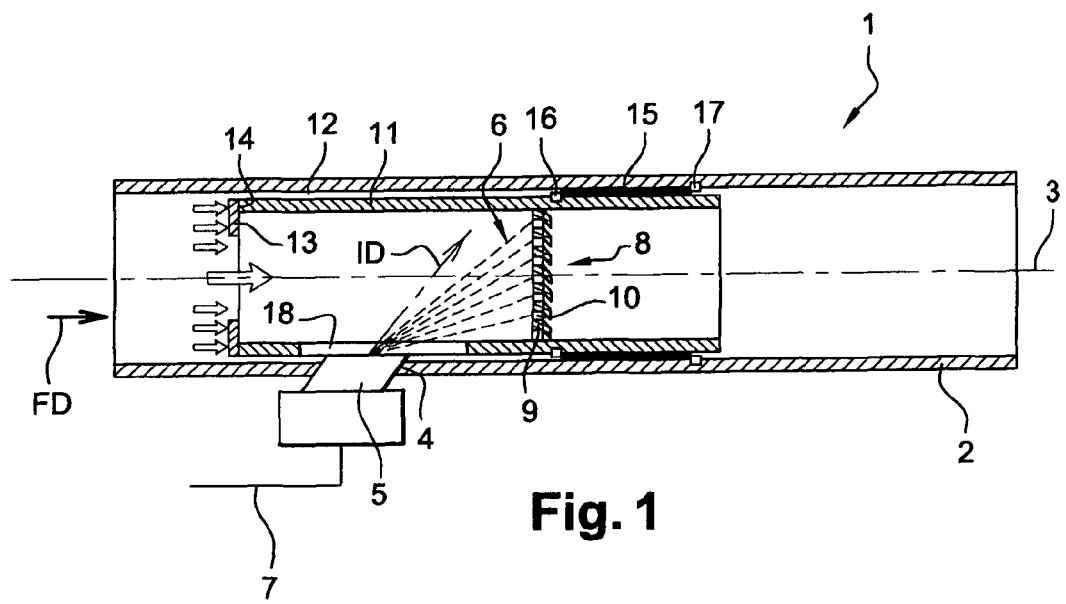
FIG. 1 is a diagrammatic cross section of a mixing system according to a first embodiment of the invention, showing an exhaust pipe equipped with an injection nozzle and an evaporating device.

As this is illustrated in the figures, a mixing system 1 is integrated in a mixing chamber which can be a pipe 2 having an axis 3. A first fluid, the exhaust gases, flows in pipe 2 according to a flow direction FD which is substantially parallel to the pipe axis 3 (upstream from any mixing device designed to generate turbulence). Here, the pipe 2 is an exhaust pipe of an engine, typically a diesel engine, and the first fluid is the exhaust gases coming from said engine.

The pipe 2 has an injection inlet 4 provided on its peripheral wall. A nozzle 5 is arranged to inject a second fluid inside the pipe 2, through said injection inlet 4, and according to an injection direction ID, thereby forming a spray 6. In the embodiments illustrated, the second fluid is a liquid, such as an aqueous solution of urea, delivered to the nozzle 5 by means of a supply pipe 7. The injection direction ID is the direction along which the second fluid is injected at the nozzle outlet, whatever the direction along which said second fluid flows further downstream, particularly if it is drawn by the first fluid.

The mixing system 1 further comprises an evaporating device 8 positioned inside pipe 2, downstream from the injection inlet 4. The evaporating device 8 for example comprises a principal evaporating portion extending within the pipe section, and which can be in the form of a plate 9 substantially orthogonal to the pipe axis 3 and provided with holes 10 for allowing the passage of fluids therethrough. The evaporating device 8 is preferably made of a highly thermally conductive material such as a metal or any material having a thermal conductivity higher than 1 W/(m·K), and preferably higher than 10 W/(m·K). As a result, it can be heated by hot exhaust gases and it can cause the evaporation of liquids coming into contact with it.

In the illustrated embodiments, the evaporating device 8 also acts as a mixing device, i.e. it generates turbulence which improves the mixing of the exhaust gases (first fluid) and of the urea (injected second fluid). In other embodiments (not shown), the mixing system could comprise a separate mixing device.

Figure 2:
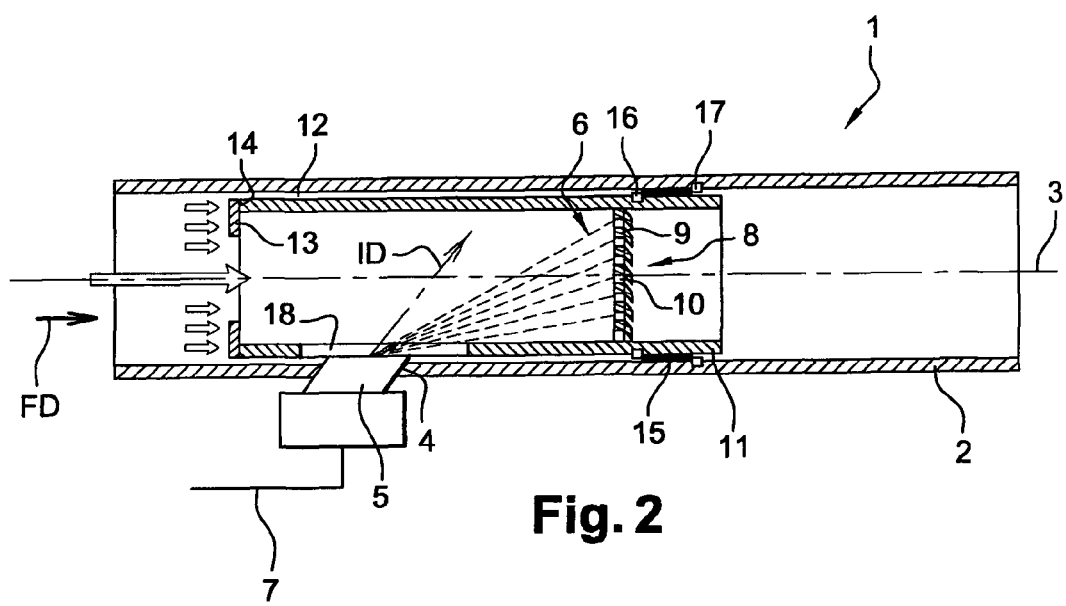
FIG. 2 shows the mixing system of FIG. 1, with the exhaust gases having a higher flow rate.

A first embodiment of the invention will now be described with reference to FIGS. 1 and 2.

According to this embodiment, there is provided an evaporating device comprising, in addition to its principal evaporating portion 9, an inner duct 11 arranged substantially coaxially inside the pipe 2. The inner duct 11 has an outside diameter slightly smaller than the inside diameter of pipe 2, so that a substantially cylindrical space 12 is provided between the inner duct 11 and the pipe 2 through which a small amount of the exhaust gases can flow.

The inner duct 11 has an annular collar 13 projecting inwardly from the upstream edge 14 of said inner duct 11. The inner duct 11 as well as the annular collar 13 can be made of a thin metal.

The inner duct 11 is movably bound to the pipe 2 by means of a helical compression spring 15 located in the cylindrical space 12, said spring 15 having its upstream end 16 coupled to the inner duct 11 and its downstream end 17 coupled to the pipe 2. The spring 15 tends to move the inner duct 11 upstream with respect to the pipe 2. When exhaust gases flow in the pipe 2, the pressure of said gases onto the annular collar 13 and on the principal evaporating portion 9 pushes the whole evaporating device 8 downstream, thereby compressing the spring 15 from its released condition towards its compressed condition. An opening 18 is provided in the inner duct wall, said opening 18 being large enough to face the injection inlet 4 whatever the position of the inner duct 11 with respect to the pipe 2, at least for those positions where the inner duct might interfere. Thus, the nozzle 5, which is fixed with respect to the pipe 2, can inject the second fluid inside the inner duct 11 through the injection inlet 4 and the opening 18 whatever the position of the inner duct 11 with respect to the pipe 2. It has to be noted that, in this embodiment, the injection direction ID is invariable, i.e. forms a steady angle with the flow direction FD.

Besides, the principal evaporating portion 8 of the device is fixed inside the inner duct 11, downstream from the opening 18. With this arrangement, when the flow rate of the exhaust gases increases from a first value (FIG. 1) to a higher second value (FIG. 2), the thrust of the exhaust gases on the evaporating device, and especially on the annular collar 13, increases and pushes the inner duct 11 further downstream with respect to the pipe 2. As a consequence, the evaporating device 8 is moved downstream with respect to the nozzle 5. The increase in the exhaust gases flow rate also results in a more pronounced deflection of the spray 6 of the injected fluid. Therefore, the downstream deflection of the spray 6 in combination with the downstream move of the evaporating device 8 ensures that a substantial portion of the flow of the injected fluid hits the evaporating device 8.

On the contrary, when the flow rate of the exhaust gases decreases, the pressure of the exhaust gases onto the evaporating device is lowered, and the spring 15 tends to move the inner duct 11 back upstream with respect to the pipe 2. Thus, the evaporating device 8 comes closer to the nozzle 5. Simultaneously, the deflecting effect of the exhaust gases onto the injected fluid is lowered, so that the spray 6 of said second fluid is less inclined with respect to the pipe axis 3. These two combined effects ensure that a substantial portion of the flow of the injected second fluid hits the evaporating device 8.

As a conclusion, whatever the flow rate of the exhaust gases, i.e. whatever the engine operating conditions, the injected fluid predominantly hits the evaporating device 8 rather than the inner duct wall, opposite the injection inlet 4. Thus, substantially no solid deposit can form on the inner duct wall. Moreover, since the evaporating device 8 is heated by the exhaust gases, it prevents the second fluid from crystallizing on it. In this embodiment, it can be seen that the thrust of the exhaust gases acting on a movable member, here the annular collar and the principal evaporating portion 8 portion, forms passive control means for moving the evaporating device in one direction. The biasing means, which can take the form of any spring, either metallic, elastomeric or gas powered, which resist and counteract the thrust of the exhaust gases, form control means for moving the evaporating device in the other direction.

These passive means require a careful initial calibration of the aerodynamic resistance of the evaporating device and of the force of the biasing means. On the other hand, the passive means do not need any electronic control.

Figure 3:
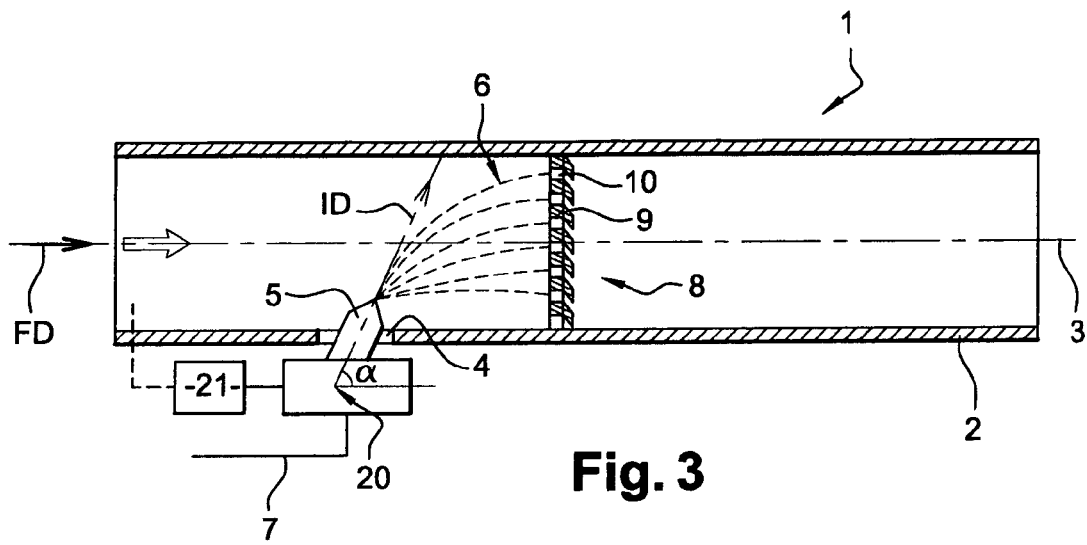
FIG. 3 is a diagrammatic cross section of a mixing system according to a second embodiment of the invention, showing an exhaust pipe equipped with an injection nozzle and an evaporating device.
Figure 4:
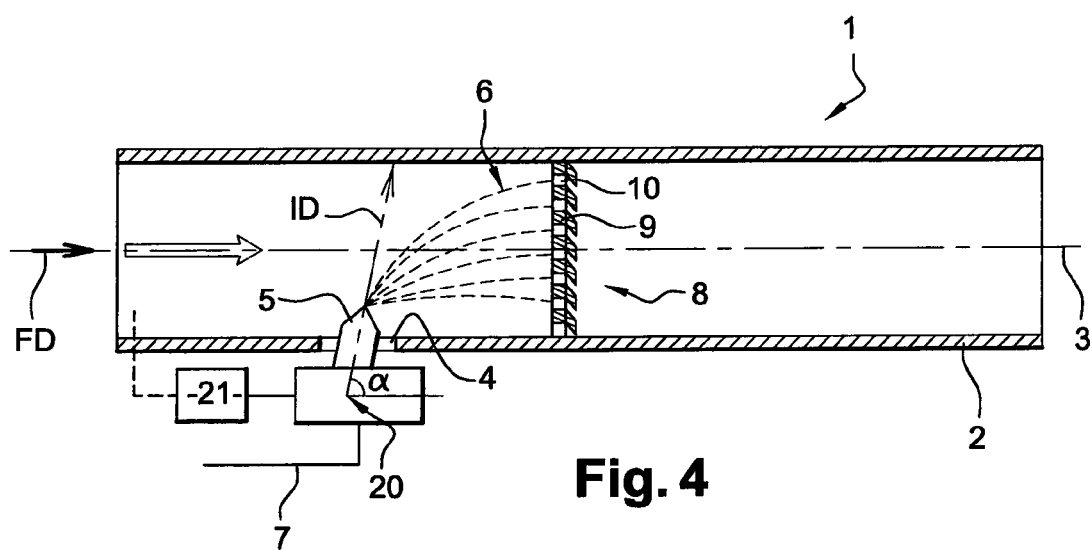
FIG. 4 shows the mixing system of FIG. 3, with the exhaust gases having a higher flow rate.

A second embodiment of the invention will now be described with reference to FIGS. 3 and 4.

According to this embodiment, no inner duct is provided. The evaporating device 8 is fixed inside the pipe 2 and the nozzle 5 can pivot with respect to the pipe 2 so as to inject the fluid along an injection direction ID which is all the more tilted with respect to the pipe axis 3 as the exhaust gases flow rate is high. Indeed, a low flow rate means a smaller deflection of the second fluid spray 6 by the exhaust gases; thus, it is necessary to inject the second fluid according to a less tilted injection direction ID so that the second fluid is directed towards the evaporating device 8.

The pivoting axis 20 of nozzle 5 is parallel to a plane substantially tangential to the pipe 2 at the injection inlet 4 and which is orthogonal to the pipe axis 3. The angle α between the flow direction FD and the injection direction ID can be adjusted by active control means 21 which may include an actuator. Said active control means may comprise a stepping motor adapted to pivot the nozzle 5 so that said angle α increases when the first fluid flow rate increases. For example, the angle α may range from about 35° to about 80°, depending on the exhaust gas flow rate.

With this arrangement, when the flow rate of the exhaust gases increases from a first value (FIG. 3) to a higher second value (FIG. 4), the control means 21 make the nozzle 5 pivot so that the angle α between the flow direction FD and the injection direction ID increases. The increase in the exhaust gases flow rate also results in a more pronounced deflection of the spray 6 of the injected second fluid. Therefore, the upstream tilting of the injection direction ID in combination with the more pronounced deflection of the spray 6 ensures that a substantial portion of the flow of the injected fluid hits the evaporating device 8 which, in this example, does not move axially with respect to the nozzle 5.

On the contrary, when the flow rate of the exhaust gases decreases, the control means 21 make the nozzle 5 pivot so that the angle α decreases. In other words, the second fluid is injected further downstream. Simultaneously, the deflecting effect of the exhaust gases onto the injected second fluid is lowered, so that the spray 6 of said second fluid is less inclined with respect to the pipe axis 3. These two combined effects ensure that substantially the whole flow of the injected second fluid hits the evaporating device 8.

In this example, the actuator can be a two way actuator able to move the nozzle in both directions. It could also be a one way actuator associated with biasing means for resisting and counteracting the actuator and returning the nozzle in the other direction. As a conclusion, whatever the flow rate of the first fluid, i.e. whatever the engine operating conditions, the injected second fluid predominantly hits the evaporating device 8 rather than the inner duct wall, opposite the injection inlet 4. Thus, substantially no solid deposit can form on the inner duct wall. Moreover, since the evaporating device 8 is heated by the exhaust gases, it prevents the second fluid from crystallizing on it.

Of course, the invention is not restricted to the embodiments described above by way of non-limiting examples, but on the contrary it encompasses all embodiments thereof.

For example, rather than having one only of the nozzle and of the evaporating device being movable, both could be movable, for example to increase the range of operating conditions in which it is managed to have the a substantial portion of the injected fluid reaching directly the evaporating device.

Also, it is possible either to have passive control means for controlling the movement of the nozzle and/or active control means for controlling the movement of the evaporating device, or to have a fully passive or a fully active system.

The active control means actuator could be an electrical motor or a hydraulically or pneumatically operated actuator.

In any case, the active means will preferably be electronically controlled. Such electronic control may take into consideration one or several operating conditions to determine the most suitable position of the nozzle and/or of the evaporating device, such as for example the exhaust gases flow rate, pressure and temperature, engine load, engine rpm, fluid injection flow rate and pressure, etc. In the embodiments above, the mixing system according to the invention is located in a tubular exhaust pipe, said pipe forming a mixing chamber. It could be incorporated in any kind of mixing chamber included in the exhaust line of the engine such as in a the so-called swirl-box as described in document FR-2.891.305. Also, the movement of the nozzle and/or of the evaporator device could be different from those described above. For example, the movement of the nozzle could be a linear movement, either along the flow direction or along the injection direction, or could be a combined movement including a linear and rotational components. The mixing system is particularly suitable for the injection of a liquid in the flow of exhaust gases, especially when the injection direction and the main flow direction are not parallel.

The invention claimed is:

1. A mixing system for an exhaust gases after-treatment arrangement, the mixing system comprising:
   a mixing chamber in which exhaust gases can flow in a flow direction;
   a nozzle designed to inject a fluid inside the mixing chamber at an injection inlet, according to an injection direction; and
   an evaporating device positioned inside the mixing chamber, the evaporating device having a principal evaporating portion located downstream from the injection inlet along the flow direction;
   wherein at least one of the nozzle and the evaporating device is movable linearly in the flow direction with respect to the other one of the nozzle and the evaporation device, so that a substantial portion of a flow of the fluid injected into the mixing chamber hits the principal evaporating portion regardless of a flow rate of the exhaust gases.

2. The mixing system according to claim 1, comprising control means capable of controlling the position of at least one of the nozzle and of the evaporating device relative to the evaporating device and to the nozzle, respectively.

3. The mixing system according to claim 2, wherein the control means comprises passive means including the thrust of the exhaust gases acting on a movable member for moving the at least one of the evaporating device and the nozzle.

4. The mixing system according to claim 2, wherein the control means comprises active means including an actuator acting on a movable member for moving the at least one of the evaporating device and the nozzle.

5. The mixing system according to claim 4, wherein the control means comprises biasing means for resisting and counteracting the thrust of at least one of the exhaust gases and the actuator.

6. The mixing system according to claim 1, wherein the evaporating device is designed to be moved downstream within the mixing chamber when the exhaust gases flow rate increases.

7. The mixing system according to claim 3, wherein the control means comprises biasing means for resisting and counteracting the thrust of the exhaust gases or the actuator, the evaporating device is designed to be moved downstream within the mixing chamber when the exhaust gases flow rate increases, and the evaporating device is designed to be moved downstream within the mixing chamber, against the biasing means, under the effect of the exhaust gases thrust, the biasing means aiming at moving the evaporating device upstream with respect to the mixing chamber.

8. The mixing system according to claim 6, wherein the evaporating device comprises an inner duct located inside the mixing chamber and having an axis substantially parallel to the mixing chamber axis, and the principal evaporating portion extends substantially across the inner duct.

9. The mixing system according to claim 8, wherein a substantially cylindrical space is provided between the inner duct and the mixing chamber to allow a small amount of exhaust gases to flow through the space.

10. A mixing system for an exhaust gases after-treatment arrangement, the mixing system comprising;
    a mixing chamber in which exhaust gases can flow in a flow direction;
    a nozzle designed to inject a fluid inside the mixing chamber at an injection inlet; according to an injection; and
    an evaporating device positioned inside the mixing chamber, the evaporating device having a principal evaporating portion located downstream from the injection inlet along the flow direction,
    wherein the nozzle and the evaporating device are movable one with respect to the other, so that a substantial portion of a flow of the fluid injected into the mixing chamber hits the principal evaporating portion regardless of a flow rate of the exhaust gases,
    wherein the control means comprises passive means including thrust of exhaust gases acting on a movable member for moving the at least one of the evaporating device and the nozzle,
    wherein the control means comprises biasing means for resisting and counteracting the thrust of the exhaust gases or the actuator, the evaporating device is designed to be moved downstream within the mixing chamber when the exhaust gases flow rate increases, and the evaporating device is designed to be moved downstream within the mixing chamber, against the biasing means, under the effect of the exhaust gases thrust, the biasing means aiming at moving the evaporating device upstream with respect to the mixing chamber, and
    wherein the evaporating device is designed to be moved downstream within the mixing chamber when the exhaust gases flow rate increases, the evaporating device comprises an inner duct located inside the mixing chamber and having an axis substantially parallel to the mixing chamber axis, and comprises a principal evaporating portion extending substantially across the inner duct, and the inner duct is designed to be moved downstream within the mixing chamber under the effect of the exhaust gases thrust, the biasing means aiming at moving the evaporating device upstream with respect to the mixing chamber.

11. The mixing system according to claim 10, wherein the inner duct has an annular collar projecting inwardly from the upstream edge of the inner duct, the thrust of the exhaust gases applying on the annular collar.

12. The mixing system according to claim 8, wherein an opening is provided in the inner duct wall to allow the injection of the fluid inside the inner duct through the opening.

13. The mixing system according to claim 1, wherein the nozzle can pivot with respect to the mixing chamber about an axis which is parallel to a plane substantially tangential to the mixing chamber at the injection inlet and which is orthogonal to the mixing chamber axis so that the flow direction and the injection direction form a varying angle.

14. The mixing system according to claim 2, wherein the control means are adapted to pivot the nozzle so that the angle between the flow direction and the injection direction increases when the exhaust gases flow rate increases.

15. The mixing system according to claim 1, wherein the fluid is an aqueous solution of urea, or fuel.

16. The mixing system according to claim 1, wherein the evaporating device includes a thermally conductive material.

* * * * *